(12) United States Patent
Ting

(10) Patent No.: US 6,665,455 B1
(45) Date of Patent: Dec. 16, 2003

(54) STRUCTURE OF AN IMAGE-SENSING MODULE

(75) Inventor: Chih-Yu Ting, Sanchung (TW)

(73) Assignee: Opcom Inc., Sanchung (TW)

( * ) Notice: Subject to any disclaimer, the term of this patent is extended or adjusted under 35 U.S.C. 154(b) by 708 days.

(21) Appl. No.: 09/637,881

(22) Filed: Aug. 14, 2000

(51) Int. Cl.$^7$ .......................... G06K 7/00; H04N 5/225; G03B 17/02
(52) U.S. Cl. ...................... 382/312; 348/373; 396/535; 396/541
(58) Field of Search .................. 382/312; 348/207.99, 348/294, 373; 396/429, 542, 535, 541

(56) References Cited

U.S. PATENT DOCUMENTS

| | | | |
|---|---|---|---|
| 4,862,208 A | * | 8/1989 | Yamada et al. ............. 396/542 |
| 5,502,598 A | * | 3/1996 | Kimura et al. .............. 359/814 |
| 6,249,653 B1 | * | 6/2001 | Itoh et al. .................... 396/535 |
| 6,341,902 B1 | * | 1/2002 | Sato et al. ................... 396/529 |

FOREIGN PATENT DOCUMENTS

| JP | 05232257 A | * | 9/1993 | ............ G04G/1/00 |
|---|---|---|---|---|
| JP | 11054220 A | * | 2/1999 | ............ H01R/23/68 |

* cited by examiner

Primary Examiner—Wenpeng Chen
(74) Attorney, Agent, or Firm—Rosenberg, Klein & Lee

(57) ABSTRACT

A structure of an image-sensing module includes: a top cover; a bottom cover; a set of optical lenses module; at least an elastic pressing strap; an image-sensing transistor; and a soft-tppe circuit board in combination with the image-sensing transistor in transmitting electrical signals, wherein the top cover is provided with a through hole for the engagement with the optical lenses module, and the mounting face between the top cover and the bottom cover is provided with a protruded and depressed bodies for locking with each other, such that the top and the bottom covers can be sealed or detached, and within the interior of the top cover and the bottom cover, the image-sensing transistor, the elastic pressing straps and the soft-type circuit board connected to the image-sensing transistor are stacked with one another, such that the top cover, by means of a lower pressing-strap, causes the soft-type circuit board stacked and connected with the image-sensing transistor portion to mutually press against each other, and the image-sensing transistor urgingly connected at the internal surface of the bottom cover, and the sensing portion faces the position mounted with the optical lenses module mounted at the top cover, and receives the projection of images passing through the optical lenses module to produce image electrical signals which are then transmitted via the soft-type circuit board.

7 Claims, 5 Drawing Sheets

STRUCTURE OF AN IMAGE-SENSING MODULE

BACKGROUND OF THE INVENTION 1. (a) Technical Field of the Invention

The present invention relates to a structure of an image-sensing module, and in particular, a detachable image-sensing module where components constituted the module within an enclosed module can be replaced and repaired, and elastic pressing straps used to pressing to connect a soft-type circuit board to the electrical connection of an image-sensing transistor.

2. (b) Description of the Prior Art

Digital images possess the characteristics of convenience in image-digitization, and as a result of developments of digital-imaging technology, image-sensing modules have become an indispensable component in photography technology. Ideally, the image-sensing module must be detachable so as to allow repairing or displacement of defect parts or components within the enclosed structure of the module, or allow the inspection of the components constituted the module after it has been manufactured to upgrade the quality of the image-sensing module. In addition, the size of the image-sensing module should be small to facilitate portability or to be kept within a limited space in order to proceed with monitoring engineering works, such as inspection of manhole, inspection of cracks formed on the walls, etc.

FIG. 1 shows a perspective view of a conventional image-sensing module. The entire structure of the module is fully sealed and cannot be detached or separated to repair or maintain the components contained therein. The drawback of such conventional module is that any dust particles, or foreign objects, etc. within the module formed in the process of manufacturing cannot be removed and these dust particles or foreign objects, etc. shall remain within the module forever. The particles therefore will affect the resolution of images in photography. Even these dust particles or foreign objects, etc. can be detected, and they cannot be removed for the reason that the image-sensing module cannot be detached or opened up for repairing or maintenance. Accordingly these defect products have to be discarded, and it is a waste of resources, and causes environmental pollution.

Referring to FIG. 1, conventionally, a plurality of electrical signal cables 10,11, . . . are inserted into the interior of the image-sensing module and are connected to a plurality of connection legs of an image-sensing transistor (as shown in the figure.) within the image-sensing module. These connections are then respectively soldered and digital images are obtained by the image-sensing transistor, and are then transmitted out by means of the electrical signal cables 10, 11, . . . As a great number of soldered points are required, it is rather laborious and troublesome in the manufacturing process. Additionally, the protruded soldered points thus formed within the interior of the image-sensing module and the plurality of electric signal cables cause an increase in the thickness of components, which are stacked on each other. In order to accommodate these components, the image-sensing module cannot be made into a smaller size structure. Thus, the object of small in size for an image-sensing module cannot be achieved.

There are small size image-sensing modules available in the market, such as pinhole camera. This is achieved by soldering small electric signal wires to components constituted the module. The small size image-sensing module is thus obtained by discarding other functions of the components, for instance, images of lower resolution, thinner image-sensing transistors. In view of the above, it is a principle object of the present invention to obtain an image-sensing module of small size but with high-resolution images.

SUMMARY OF THE INVENTION

Accordingly, it is an object of the present invention to provide a structure of an image-sensing module which enclose all the components between the enclosed space formed from the top cover and the bottom cover, which both provide respectively with a plurality of protruded and depressed bodies for mounting with each others, such that the top cover and the bottom cover can be detached or opened from one another. After the two covers are mounted, they are sealed with glue, and thus, the covers can be separated in case the enclosed components are required to be repaired, or be maintained.

Yet another object of the present invention is to provide a structure of an image-sensing module, wherein a through hole which can be sealed later is provided at the lateral walls of the top cover or the bottom cover to allow the cleaning of the module prior to sealing with glue.

A further object of the present invention is to provide a structure of an image-sensing module, wherein the interior enclosed by the top cover and the bottom cover is provided with a flexible pressing strap urged the soft-type circuit board and the electrical connection region of the image-sensing transistor.

Another further object of the present invention is to provide a structure of an image-sensing module, wherein no soldered points are formed and thus allow the increasing of stacked thickness, and the soft-type circuit board with thinner electrical signal cable is used for transmission. Accordingly, the stacked height of the components is lower and the top and bottom cover can thus be made smaller.

Yet further objection and advantages of the present invention will become more apparent from the following description taken in conjunction with the accompanying drawing.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
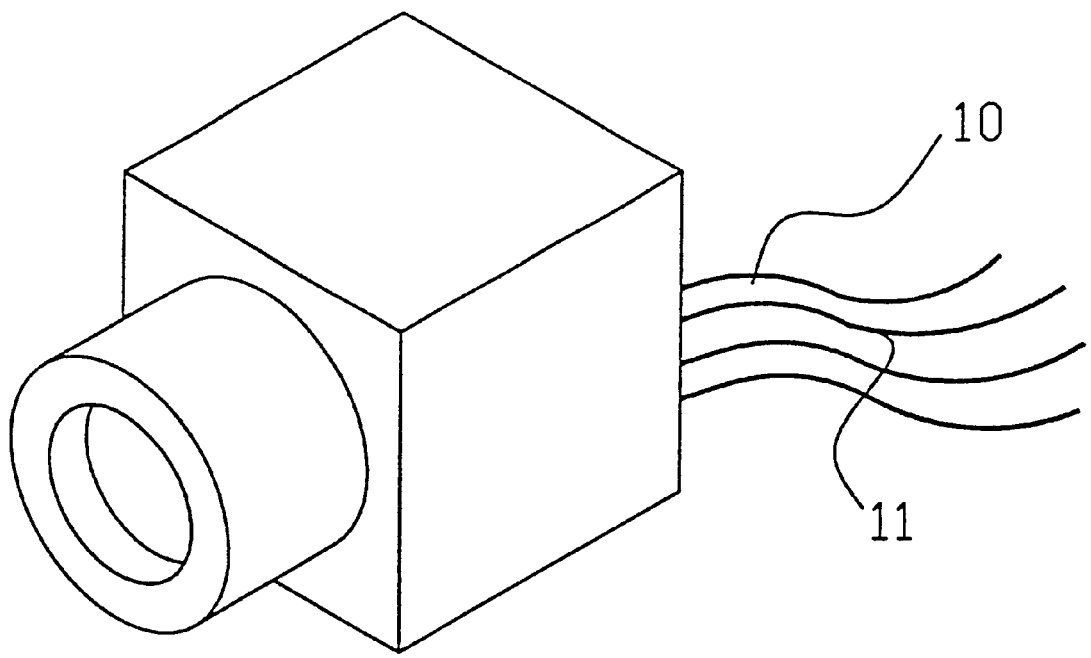
FIG. 1 is a perspective view of a conventional image-sensing module.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
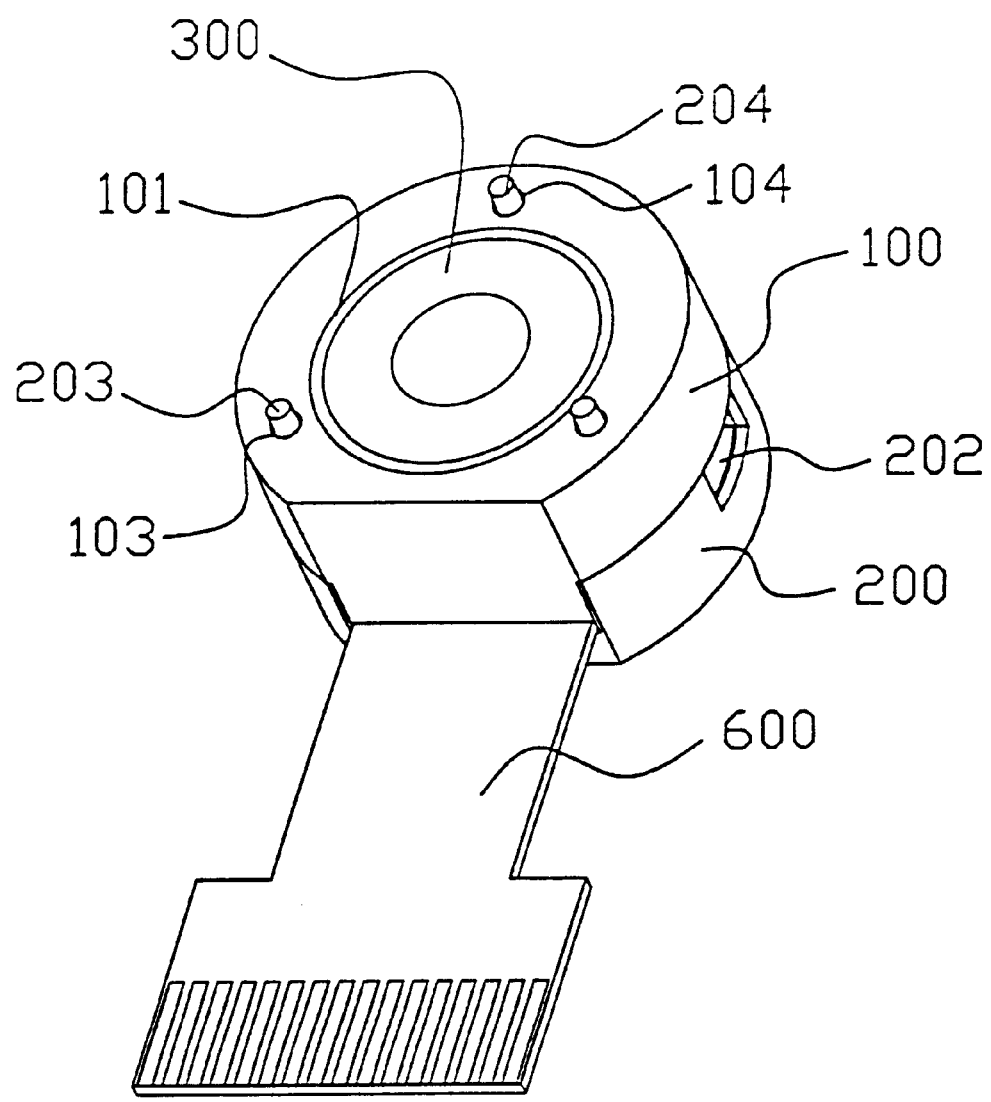
FIG. 2 is a perspective view of an image-sensing module in accordance with the present invention.
Figure 3:
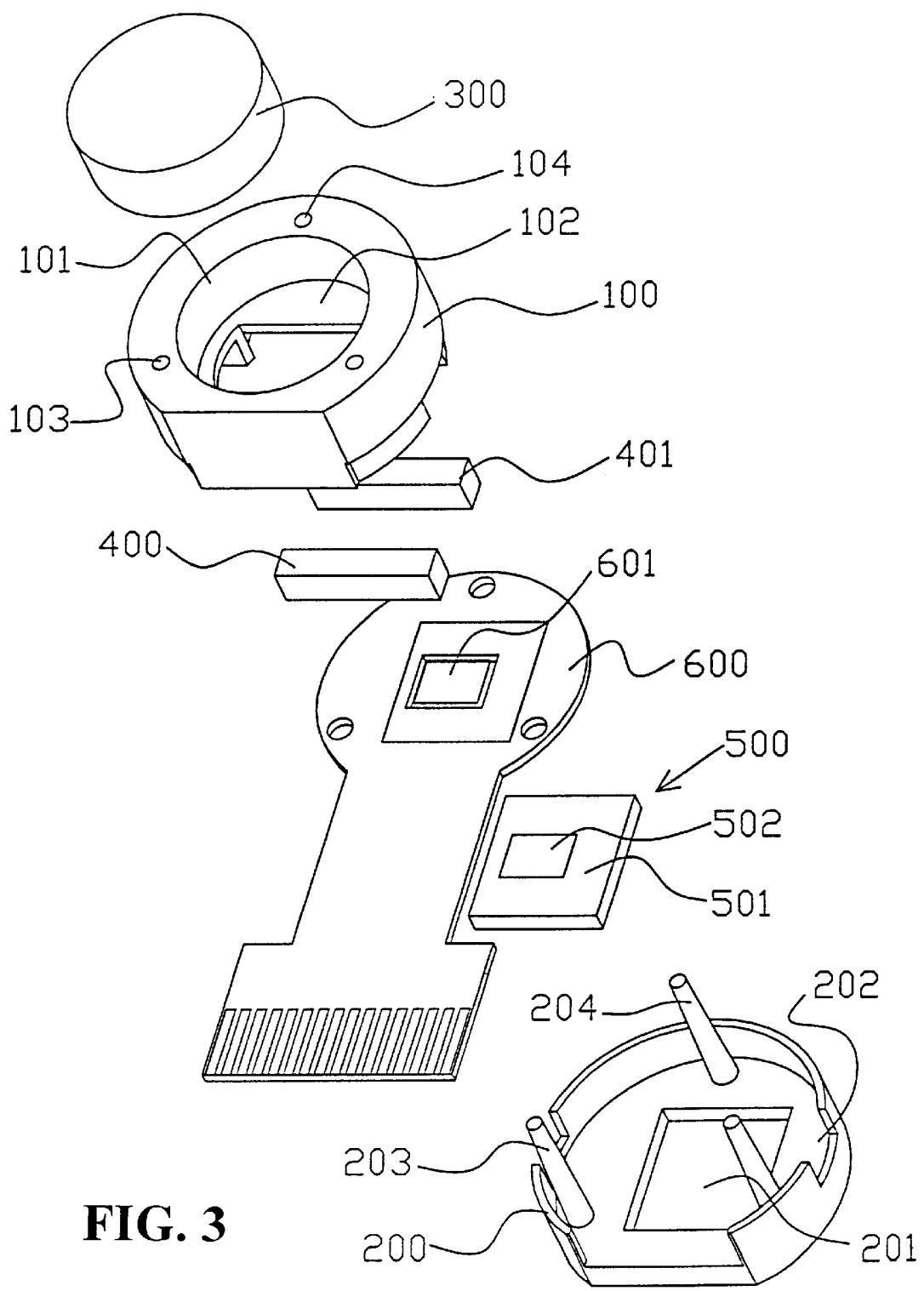
FIG. 3 is a perspective exploded view of an image-sensing module in accordance with the present invention.

Referring to FIG. 2, there is shown a perspective view of the image-sensing module in accordance with the present invention. FIG. 3 shows a perspective exploded view of the image-sensing module of FIG. 2. In accordance with the present invention, the structure of an image-sensing module comprises (a) a top cover 100; (b) a bottom cover 200; (c) a set of optical lenses module 300 comprising a plurality of lenses stacked together with a plurality of optical filters; (d) at least a flexible pressing strap 400, 401; (e) an image-sensing transistor 500; and (f) a soft-type circuit board 600 in combination with the image-sensing transistor 500 in transmitting electrical signals, wherein the top cover 100 is provided with a through hole 101 at the center thereof for the engagement with the optical lenses module 300, and the mounting face between the top cover 100 and the bottom cover 200 is provided with a protruded and depressed bodies for locking with each other, such that the top and the bottom covers 100, 200 can be sealed or detached. In accordance with the present invention, within the through hole 101, corresponding to the lower edge of the optical lenses module 300, a supporting plate 102 is provided to support the bottom section of the lenses module 300 to avoid the dropping of the lenses module 300. As shown in FIG. 2, the surrounding of the top cover is provided with a plurality of positioning holes, 103, 104, . . . , and the surrounding of the bottom cover 200 is provided with a plurality of positioning pegs 203, 204, . . . which correspond to that of the positioning holes, 103, 104 . . . . This structure allows the locking of the top cover 100 with the bottom cover 200. In accordance with the present invention, a sealable through hole 202 is provided at the lateral walls of the top cover 100 or the bottom cover 200.

In accordance with the present invention, if the dust or particles are found within the interior of the image-sensing module, clean air is ejected into the interior via the through hole 202 to remove the dust or particles.

Figure 4:
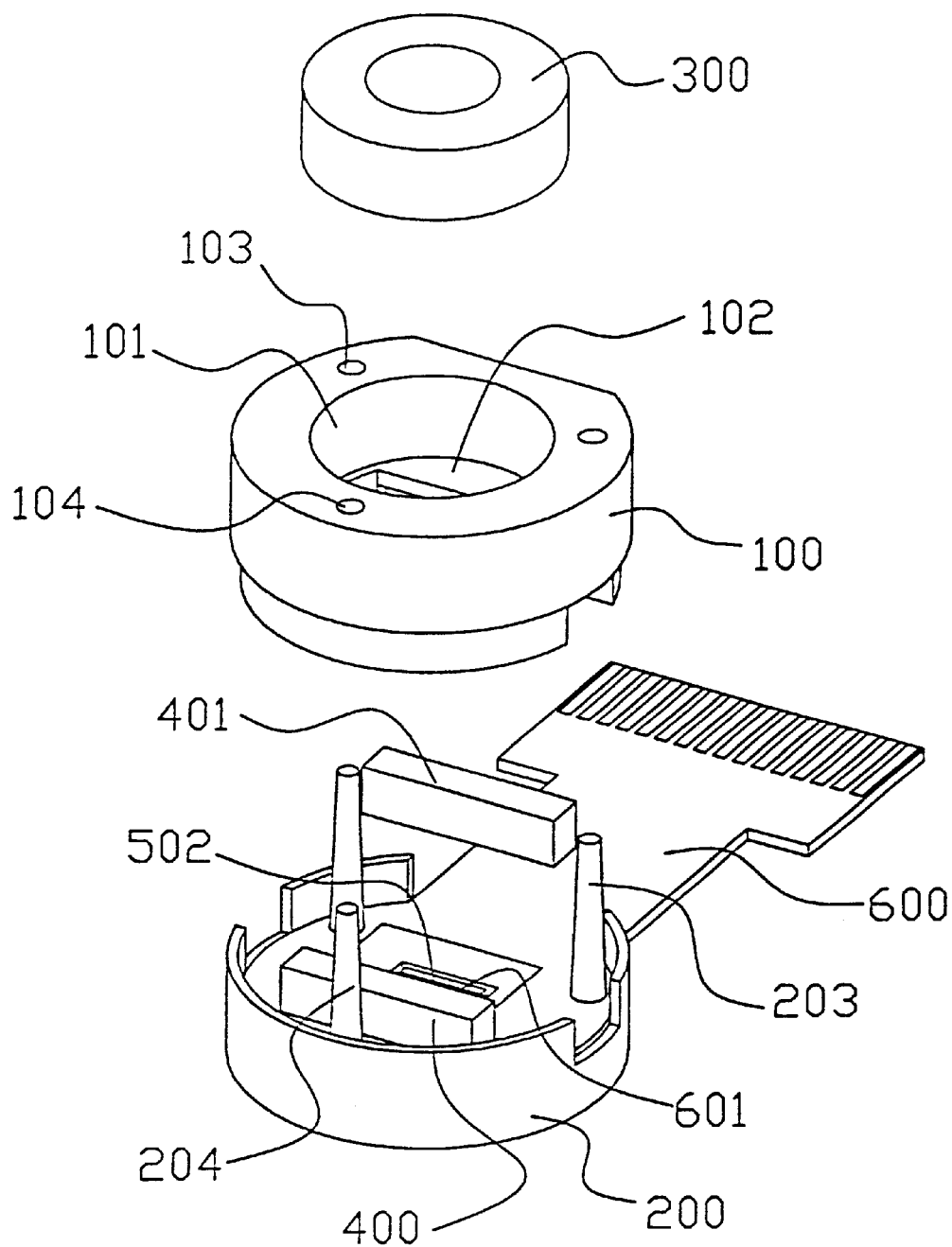
FIG. 4 is a perspective view, partial exploded, of an image-sensing module in accordance with the present invention.

After the top cover 100 and the bottom cover 200 are mounted to each other, the image-sensing transistor 500, the flexible pressing-straps 400, 401, and the soft-type circuit board 600 electrically connected to the image-sensing transistor 500 are enclosed within the covers 100, 200. Referring to FIG. 4, by means of the bottom pressing straps 400, 401, the pressing straps 400, 401 cause the soft-type circuit board 600 to urgingly connect with the connection portion 501 of the image-sensing transistor 500, such that the image-sensing transistor 500 is secured to the engaging space 201 of the transistor 500 within the internal surface of the bottom cover 200. The sensing region 502 of the image-sensing transistor 500 corresponding to the soft-type circuit board 600 is provided with a through hole 601 such that the sensing region 502 is exposed out from the through hole 601 of the soft-type circuit board 600 and is facing the position of the top cover 100 which is engaged with the optical lenses module 300. In addition, the electrical connection region 501 is first coated with a layer of conductive film (ACF) and is adhered conductively by a heat treatment process. Thus, the film is firmly coated to the soft-type circuit board 600.

Figure 5:
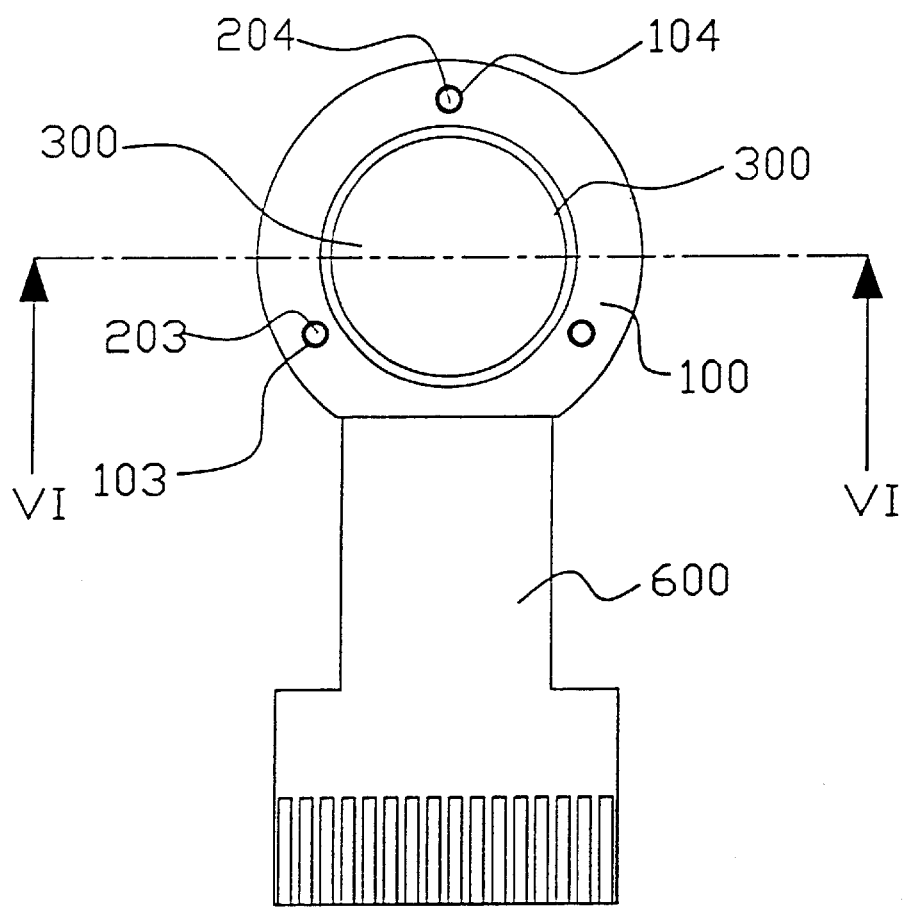
FIG. 5 is a top view of the image-sensing module of FIG. 2 of the present invention.
Figure 6:
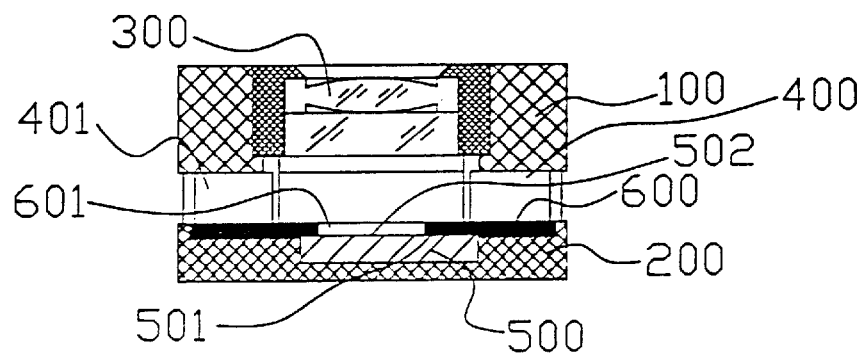
FIG. 6 is a sectional view of the image-sensing module in accordance with the present invention.

FIG. 5 is a top view of the imaging-sensing module and FIG. 6 is a sectional view of the imaging-sensing module of the present invention. Due to the fact that the height of the pressing-straps 400, 401 is larger than the width of the gap of the stacked position. Therefore, when the top cover 100 and the bottom cover 200 are combined together, the flexible pressing-straps 400, 401 are compressed and an elastic force is formed by the flexible pressing-straps 400, 401. This will urge the soft-type circuit board 600 to stack and connect to the electrical connection 501 of the image-sensing transistor 500. Thus, an excellent electrical connection is obtained, and the image-sensing transistor 500 receives the projection of images, which passes through the lens module 300 to produce image signals which are transmitted out by means of the soft-type circuit board 600. After the image-sensing module structure has formed, melted glue is used to seal the positioning holes 103, 104, and the through hole 202, so that the entire structure is secured.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of an image-sensing module comprising
   (a) a top cover;
   (b) a bottom cover;
   (c) a set of optical lenses module;
   (d) at least an elastic pressing strap;
   (e) an image-sensing transistor; and
   (f) a soft-type circuit board in combination with the image-sensing transistor in transmitting electrical signals, wherein the top cover is provided with a through hole for the engagement with the optical lenses module, and mounting faces between the top cover and the bottom cover are provided with a protruded and depressed bodies for locking with each other, such that the top and the bottom covers can be sealed or detached, and within the interior of the top cover and the bottom cover, the image-sensing transistor, said at least an elastic pressing strap and the soft-type circuit board connected to the image-sensing transistor are stacked with one another, such that the top cover, by means of a lower pressing-strap, causes the soft-type circuit board stacked and connected with the image-sensing transistor portion to mutually press against each other, and the image-sensing transistor urgingly connected at the internal surface of the bottom cover, and the sensing portion faces the optical lenses module mounted at the top cover, and receives the projection of images passing through the optical lenses module to produce image electrical signals which are then transmitted via the soft-type circuit board.

2. A structure of an image-sensing module as set forth in claim 1, wherein the optical lenses module comprise a plurality of lenses stacked together with a plurality of optical filters.

3. A structure of an image-sensing module as set forth in claim 1 or 2, wherein a supporting plate for supporting the optical lenses module is provided within the through hole corresponding to the lower edge of the optical lenses module.

4. A structure of an image-sensing module as set forth in claim 1, wherein the protruded and depressed bodies between the top cover and the bottom cover are respectively provided with a plurality of positioning holes at the surrounding of the cover surface of the top cover and a plurality of positioning pegs at the surrounding of the cover surface of the bottom cover.

5. A structure of an image-sensing module as set forth in claim 1, wherein the internal surface of the bottom cover is provided with a transistor mounting space.

6. A structure of an image-sensing module as set forth in claim 1 or 4 or 5, wherein the lateral walls of the top cover or the bottom cover is provided with a through hole which can be sealed.

7. A structure of an image-sensing module as set forth in claim 1, wherein a region of the soft-type circuit board, corresponding to the image-sensing transistor, is provided with a through hole such that the sensing region of the transistor exposes out from the through hole of the soft-type circuit board.

* * * * *